United States Patent [19]

Johnson

[11] Patent Number: 4,711,724

[45] Date of Patent: * Dec. 8, 1987

[54] METHOD FOR PREVENTION OF PHOSPHONATE DECOMPOSITION BY CHLORINE

[75] Inventor: Donald A. Johnson, Naperville, Ill.

[73] Assignee: Nalco Chemical Company, Naperville, Ill.

[*] Notice: The portion of the term of this patent subsequent to Feb. 10, 2004 has been disclaimed.

[21] Appl. No.: 922,215

[22] Filed: Oct. 23, 1986

Related U.S. Application Data

[63] Continuation-in-part of Ser. No. 776,551, Sep. 16, 1985, Pat. No. 4,642,194.

[51] Int. Cl.$^4$ .................................................. C02F 5/14
[52] U.S. Cl. ................................. 210/699; 210/700; 210/754; 210/764; 252/180
[58] Field of Search ........................ 210/698–700, 210/754, 755, 756, 764; 252/180, 181

[56] References Cited

U.S. PATENT DOCUMENTS

| | | | |
|---|---|---|---|
| 1,989,380 | 1/1935 | Romans | 210/755 |
| 2,106,513 | 1/1938 | Allison | 210/754 |
| 2,312,221 | 2/1943 | Sprigman et al. | 210/755 |
| 2,338,987 | 1/1944 | Watzel | 210/700 |
| 3,170,883 | 2/1965 | Owen et al. | 252/187 |
| 3,214,454 | 10/1965 | Blaser et al. | 252/180 |
| 3,278,446 | 10/1966 | Irani | 252/152 |
| 3,336,221 | 8/1967 | Ralston | 210/700 |
| 3,342,674 | 9/1967 | Kowalski | 210/755 |
| 3,751,372 | 8/1973 | Zecher | 210/699 |
| 3,948,853 | 4/1976 | Horning et al. | 210/755 |
| 4,011,171 | 3/1977 | Lorenc et al. | 210/700 |
| 4,026,815 | 5/1977 | Kallfass et al. | 252/180 |
| 4,108,790 | 8/1978 | Foroulis | 210/699 |
| 4,157,364 | 6/1979 | Buckman et al. | 210/699 |
| 4,642,194 | 2/1987 | Johnson | 210/699 |

OTHER PUBLICATIONS

*Power,* "Cooling-Water Treatment for Control of Scaling, Fouling Corrosion," by Sheldon D. Strauss & Paul Puckorius, McGraw Hill, 1984.

"Small Scale Short Term Methods of Evaluating Cooling Water Treatment... Are They Worthwhile?" D. T. Reed & R. Nass, Nalco Chemical Company, International Water Conference, Pittsburgh, PA, Nov. 4–6, 1975.

*Betz* Handbook, Seventh Edition, 1976, pp. 24–27.

*Primary Examiner*—Peter Hruskoci
*Attorney, Agent, or Firm*—John G. Premo; Anthony L. Cupoli; Donald G. Epple

[57] ABSTRACT

The decomposition of phosphonates by chlorine in industrial process waters can be diminished or prevented by treating such waters with certain water-soluble nitrogen-containing compounds.

2 Claims, 4 Drawing Figures

STABILIZATION OF HEDP AND PHOSPHONOGLYCOLIC ACID (PGA)
BY SULFAMIC ACID (SAA) AND CYANURIC ACID (CYA)

STABILIZATION OF HEDP AND PHOSPHONOGLYCOLIC ACID (PGA)
BY SULFAMIC ACID (SAA) AND CYANURIC ACID (CYA)

METHOD FOR PREVENTION OF PHOSPHONATE DECOMPOSITION BY CHLORINE

INTRODUCTION

This application is a continuation-in-part of patent application Ser. No. 776,551, filed Sept. 16, 1985, now U.S. Pat. No. 4,642,194.

The use of phosphonates for scale control in recirculating cooling water is widely practiced as is the use of chlorine for microbiological control. However, the use of these two practices simultaneously can cause problems. Chlorine has been domonstrated to break down many phosphonates to a significant extent. When this happens in a field application, the effectiveness of the phosphonate as a scale control agent is degraded and the orthophosphate which is a product of this reaction can contribute to scaling problems. Even some reputedly chlorine-resistant phosphonates such as 1,1-hydroxyethylidine diphosphonic acid (HEDP) are not sufficiently stable for some industrial applications where continuous chlorination is practiced. Under carefully controlled conditions where the free chlorine residual is kept at a low constant level, breakdown of HEDP is minimal. However, under the less well controlled environment found in a typical plant cooling circuit, excessive chlorine levels are frequently observed. Under these conditions, HEDP or other phosphonates can break down to a sufficient degree to cause problems. Additionally, a number of dissolved ions typically found in cooling waters have been found to catalyze the breakdown of phosphonates.

PRIOR ART

It is well known that sulfamic acid, ammonia and amines and amides are effective as chlorine stabilizers. There are several publications and patents relating to this application, particularly for swimming pool applications. U.S. Pat. No. 3,170,883 describes the use of sulfamic acid in cooling towers as a chlorine stabilizer.

The use of phosphonates in cooling towers for scale control is also well known. There is a large body of literature on this topic. However, no prior art on the concurrent use of chlorine and chlorine stabilizers in conjunction with phosphonates to reduce their decomposition has been found.

DESCRIPTION OF THE INVENTION

It has been unexpectedly found that the use of a compound which reversibly reacts with chlorine can greatly reduce the extent of decomposition of phosphonates by chlorine. This compound acts as a buffer for chlorine, providing a reserve of combined chlorine and a continuously available low level of free chlorine. The invention, therefore, consists of the use of a "stabilizer" in conjunction with a "phosphonate" in an aqueous system to which chlorine or hypochlorites are added. These stabilizers are water-soluble nitrogen-containing compounds such as sulfamic acid, ammonia, amines, urea, and others. The combination of the stabilizer and the phosphonate therefore gives more effective scale control in the presence of chlorine than does the phosphonate by itself.

THE INVENTION

The invention comprises a method of preventing the decomposition of phosphonates in industrial process waters which contain chlorine which comprises treating such waters with at least ¼ ppm, and preferably ½ ppm, for each ppm of $Cl_2$ present in these waters of a water-soluble nitrogen-containing compound from the group consisting of:

(a) water-soluble primary and secondary amines;
(b) ammonia;
(c) sulfamic acid and its water-soluble salts;
(d) water-soluble amides.

pH

The invention is capable of treating industrial cooling waters having a pH within the range of between 3–12 and preferably 6–9.

The Phosphonates

Phosphonates which are relevant to the invention include any phosphonate which is degraded by chlorine, but especially:

(1) 1,1-hydroxyethylidine diphosphonic acid (HEDP);
(2) tris aminomethane phosphonic acid (AMP);
(3) 1-phosphono glycolic acid (PGA);
(4) ethylene diamine tetra(methylenephosphonic acid) (ENTP);
(5) hexamethylene diamine tetra(methylenephosphonic acid) (HMTP);
(6) diethylene triamine penta(methylenephosphonic acid).

As indicated, the phosphonates are well known materials and are described in the following patents: U.S. Pat. No. 3,214,454, U.S. Pat. No. 4,026,815, U.S. Pat. No. 3,336,221, and U.S. Pat. No. 3,278,446. They all may be used as the free acid or their water-soluble salt form.

The Stabilizers

The stabilizer can be any compound which reacts reversibly with chlorine, sodium or calcium hypochlorite or hypochlorous acid. These are all considered as chlorine for the purposes of this disclosure. Compounds which have been identified as being particularly effacacious for this application are:

(a) water-soluble primary and secondary amines or amides;
(b) ammonia;
(c) sulfamic acid and its water-soluble salts;
(d) water-soluble amides.

The sulfamic acid may be used as such or it may be used as its water-soluble salts, e.g. alkali metal ammonia or amine salts.

The water-soluble primary or secondary amines may be selected from a large number of compounds. Typical are methylamine, dimethylamine, ethylamine, diethylamine, propylamine, dipropylamine, methylethylamine, mono and diethanolamines, morpholine, pyrridine, and any other amine that is capable of reacting as a chlorine stabilizer.

The Water-Soluble Amides

The water-soluble amides may be selected from a wide group of compounds. The preferred amides are urea, hydantoin, and cyanuric acid. Other water-soluble amides such as acetamide may be used.

EVALUATION OF THE INVENTION

Experimental Procedures

The experimental procedures used fall into three categories.

Benchtop Bottle Tests

Test solutions containing a synthetic cooling tower water were prepared in 200 ml amber bottles. These solutions were prepared from deionized water and reagent grade salts. Appropriate commercial grade phosphonates, candidate chlorine stabilizers and chlorine were then added to the solution. The final composition of the test solutions were:

Calcium: 500 ppm ($CaCO_3$)
Magnesium: 200 ppm ($CaCO_3$)
Bicarbonate: 300 ppm ($CaCO_3$)
pH: 8.5
Phosphonate: 5.0 ppm ($PO_4$)
Chlorine: 12 ppm ($Cl_2$)
Stabilizer: varied The solution described above was prepared, stored at room temperature for 48 hours and analyzed for total phosphate and (organic + ortho phosphate). The degree of decomposition was then determined from the amount of orthophosphate generated.

Pilot Cooling Tower Test

The use of sulfamic acid for phosphonate stabilization was then tested in a pilot cooling tower (PCT) apparatus. This device is described in the article:

"Small-Scale Short-Term Methods of Evaluating Cooling Water Treatments... Are They Worthwhile?," D. T. Reed and R. Nass, Nalco Chemical Company, International Water Conference, Pittsburgh, Pa., Nov. 4–6, 1975. The PCT test was used to determine:

(1) decomposition of phosphonate by chlorine in the absence of any stabilizer;
(2) the effect of sulfamic acid in reducing this decomposition.

The composition of the water in the pilot cooling tower was four concentrations of synthetic lake water. No pH control was used and the water was allowed to reach the equilibrium pH value of 9.0–9.2. Chlorine was introduced into the system by a constant feed of 7.25% sodium hypochlorite. A scale control program containing 6% of HEDP for scale control was fed to the tower at a rate proportional to the blowdown, resulting in a constant theoretical level of HEDP in the tower. The concentration ratio of the tower was held constant by a conductivity controller. A complete analysis of the composition of the tower water was done on a daily basis. The experiment was conducted in two phases:

1. With all other factors held constant, the rate of addition of sodium hypochlorite was steadily increased and the effect on the HEDP and orthophosphate residuals observed.
2. Once a steady state of HEDP decomposition was obtained in the tower, feed of sulfamic acid was commenced and the effect on HEDP and orthophosphate levels observed. The extent of decomposition was deduced from these data.

FIELD EVALUATION

A field evaluation of this invention was conducted at a midwest polyethylene plant. This plant has a large cooling tower system which contains over a million gallons of water. The holding time of this system is exceptionally long. This plant has been using a product containing HEDP for some time and has also been practicing continuous chlorination. It has had a history of operating problems which have been related to HEDP breakdown. The field evaluation was conducted in two phases:

1. The plant was run using its normal operating practices and baseline analytical data were collected and chlorine consumption rates were logged.
2. Sulfamic acid was added to the cooling tower water and data continued to be collected.

THE DRAWINGS

FIG. 1 shows decomposition of HEDP as a function of time, with and without a stabilizer.

FIG. 2 compares two phosphonates and two stabilizers.

RESULTS AND DISCUSSION

Bottle Tests

Figure 1:
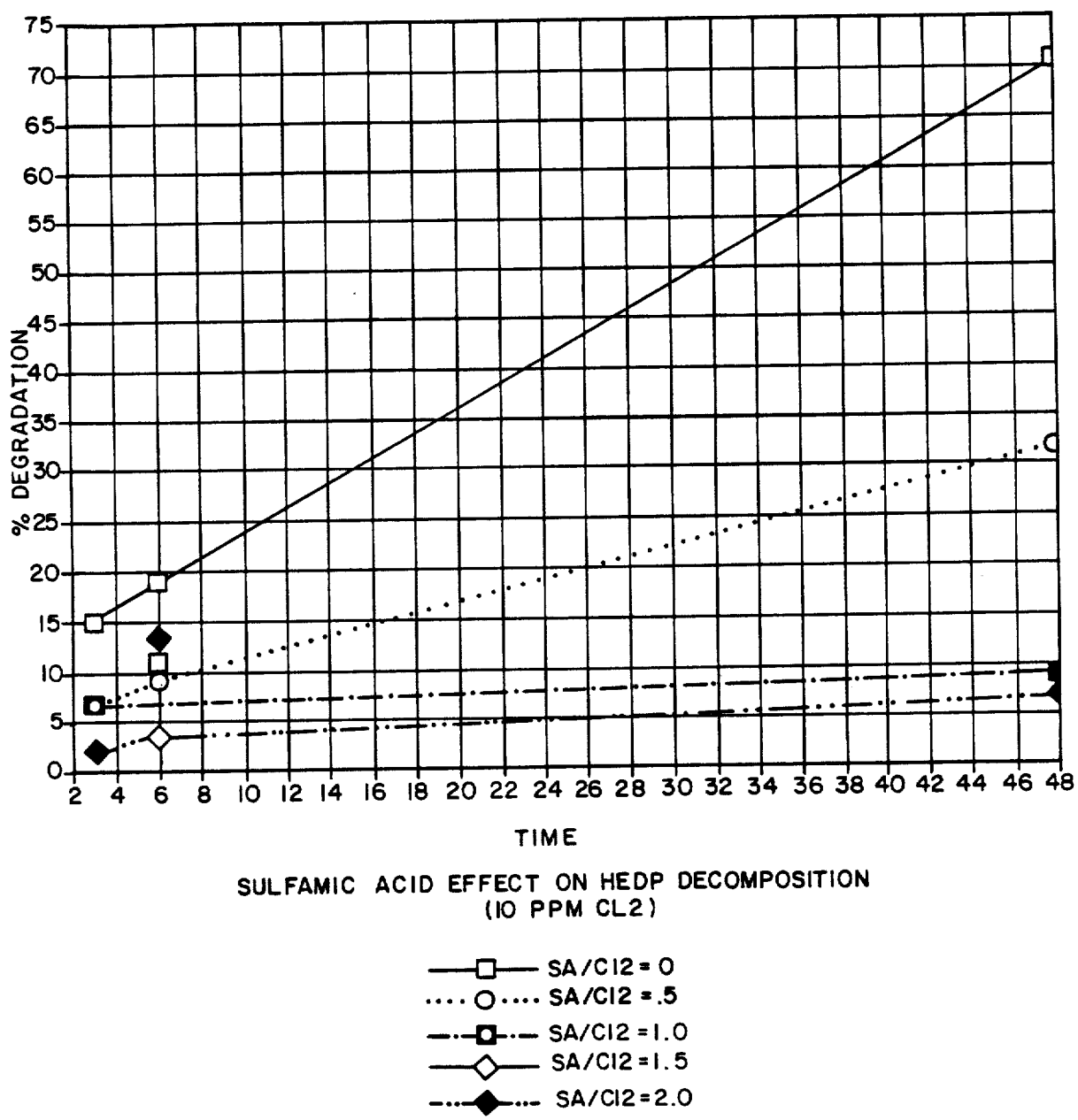

A series of bottle tests were done using the procedure described above. In the first series of tests, the mole ratio of sulfamic acid to chlorine was varied and the decomposition was measured as a function of time. FIG. 1 shows the results of this series. When the mole ratio of sulfamic acid (SA) was as low as 0.5, significant stabilization was obtained. At a mole ratio of 1 mole of sulfamic acid/chlorine, the decomposition of HEDP was completely eliminated.

Figure 2:

A second series of bottle tests illustrates the effect of two stabilizers, sulfamic acid (SAA) and cyanuric acid (CYA), on the decomposition of two phosphonates (1-hydroxyethylidine 1,1-diphosphonic acid and phosphono glycolic acid). As can be seen from FIG. 2, both of these stabilizers gave inhibition of decomposition of both phosphonates. However, sulfamic acid was substantially superior to cyanuric acid.

Pilot Cooling Tower Results

Figure 3:
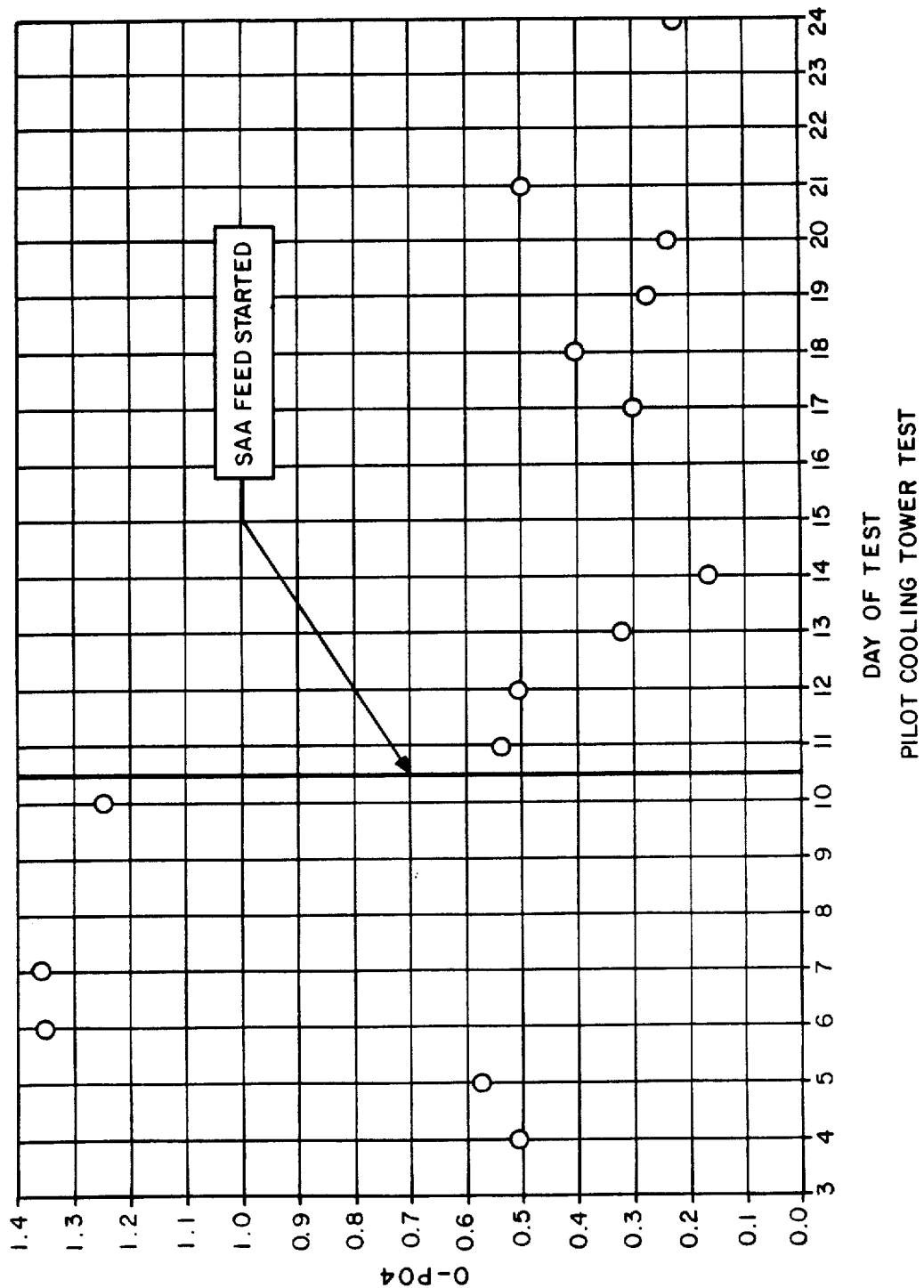
FIG. 3 shows a ten-day test in the pilot cooling tower.

Some relevant data from the pilot cooling tower test is shown in FIG. 3. The first 10 days of the test were used to establish a baseline condition for decomposition in this experiment. After an initial buildup period, substantial levels of orthophosphate were generated, indicating that the HEDP component of the treatment formulation was being decomposed. On the tenth day of the test, addition of 20 ppm of sulfamic acid (SAA) was begun. The orthophosphate level immediately fell to and was maintained at a much lower level than had been observed in the baseline period.

Field Evaluation Results

Figure 4:
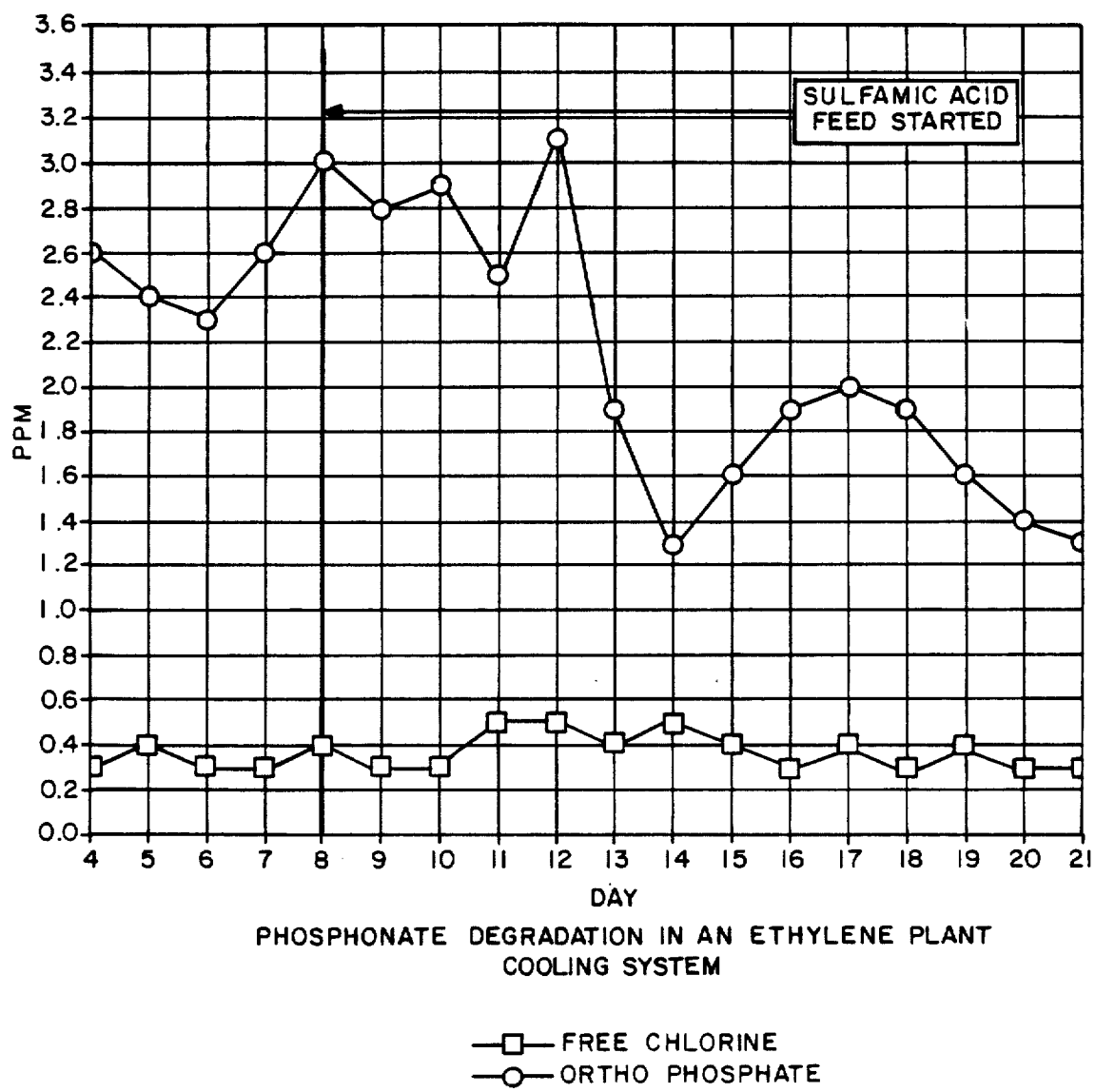
FIG. 4 shows the field results testing sulfamic acid.

The results of the field evaluation are summarized in FIG. 4. FIG. 4 shows the effect of 20 ppm of sulfamic acid on chlorine consumption. Throughout the evaluation, chlorine addition rates were such that a free residual of 0.2 to 0.4 was maintained. The addition of sulfamic acid significantly reduced the amount of chlorine required to give this residual of free chlorine. Sulfamic acid feed was commenced on the eighth day of the trial. After sufficient time had elapsed for the tower to turn over the water content, the orthophosphate content of the tower water decreased from the range of 2.5 to 3.0 ppm to an average level of 1.2 to 1.8 ppm. This field evaluation clearly shows the efficacy of sulfamic acid in reducing phosphonate degradation under field conditions.

Having thus described my invention, I claim:

1. A method of preventing the decomposition of phosphonates from the group consisting of 1,1-hydroxyethylidene diphosphonic acid, tris aminomethane phosphonic acid, 1-phosphono glycolic acid, ethylene diamine tetra (methylene phosphonic acid), hexamethylene diamine tetra (methylene phosphonic acid), and diethylene triamine penta (methylenephosphonic acid) which are present in an effective amount to prevent scale in industrial cooling waters which contain an effective amount of chlorine for microbiological control which comprises treating such waters with at least ¼ ppm of cyanunic acid.

2. The method of claim 1 where the phosphonate is 1,1-hydroxyethylidine diphosphonic acid.

* * * * *

UNITED STATES PATENT AND TRADEMARK OFFICE
CERTIFICATE OF CORRECTION

PATENT NO. : 4,711,724

DATED : DECEMBER 8, 1987

INVENTOR(S) : DONALD A. JOHNSON

It is certified that error appears in the above-identified patent and that said Letters Patent is hereby corrected as shown below:

Column 6, Line 6, Claim 1 ppm of cyanunic acid

Should Read ppm of cyanuric acid

Signed and Sealed this

Seventh Day of June, 1988

Attest:

DONALD J. QUIGG

Attesting Officer      Commissioner of Patents and Trademarks